US009189408B1

(12) United States Patent
Douglis et al.

(10) Patent No.: US 9,189,408 B1
(45) Date of Patent: Nov. 17, 2015

(54) SYSTEM AND METHOD OF OFFLINE ANNOTATION OF FUTURE ACCESSES FOR IMPROVING PERFORMANCE OF BACKUP STORAGE SYSTEM

(75) Inventors: Frederick Douglis, Basking Ridge, NJ (US); Windsor W. Hsu, San Jose, CA (US); Xing Lin, Salt Lake City, UT (US)

(73) Assignee: EMC Corporation, Hopkinton, MA (US)

( * ) Notice: Subject to any disclaimer, the term of this patent is extended or adjusted under 35 U.S.C. 154(b) by 288 days.

(21) Appl. No.: 13/601,885

(22) Filed: Aug. 31, 2012

(51) Int. Cl.
G06F 12/00 (2006.01)
G06F 21/00 (2013.01)
G06F 13/00 (2006.01)
G06F 12/08 (2006.01)
G06F 12/12 (2006.01)

(52) U.S. Cl.
CPC .......... *G06F 12/0871* (2013.01); *G06F 12/121* (2013.01); *G06F 12/0866* (2013.01); *G06F 12/122* (2013.01)

(58) Field of Classification Search
CPC . G06F 3/0641; G06F 12/0862; G06F 3/0638; G06F 3/064; G06F 3/0643; G06F 12/0871; G06F 12/121; G06F 12/0866; G06F 12/122
USPC ......... 711/113, 118, 135, 137, 147, 161, 162, 711/204; 709/214, 231; 707/E17.005, 133, 707/136, 118
See application file for complete search history.

(56) References Cited

U.S. PATENT DOCUMENTS 7,240,143 B1 * 7/2007 Scheffler et al. ................. 711/3
8,667,273 B1 3/2014 Billstrom et al.
8,831,003 B2 9/2014 Guo et al.
2005/0044331 A1 * 2/2005 Simms ........................ 711/159
2009/0125753 A1 * 5/2009 Kryka ............................. 714/6
2010/0235579 A1 9/2010 Biles et al.
2011/0119426 A1 5/2011 Boyle et al.
2011/0276744 A1 11/2011 Sengupta et al.
2011/0307447 A1 12/2011 Sabaa et al.
2011/0307664 A1 12/2011 Paver et al.
2012/0221802 A1 * 8/2012 Huang ........................ 711/154
2013/0036277 A1 2/2013 Szczepkowski et al.

(Continued)

OTHER PUBLICATIONS

Lillibridge et al., Sparse Indexing: Large Scale, Inline Deduplication Using Sampling and Locality, Jun. 6 2009, USENIX Conference on File and Storage Technologies (FAST '09), pp. 1-14.*

(Continued)

*Primary Examiner* — Sanjiv Shah
*Assistant Examiner* — Shane Woolwine
(74) *Attorney, Agent, or Firm* — Blakely, Sokoloff, Taylor & Zafman LLP

(57) ABSTRACT

A system and method of offline annotation of future access are disclosed. According to one embodiment, a request is received at a storage system to read a portion of a file stored in the storage system. In response to the request, chunks of the file are cached in a cache memory of the storage system. In response to a request for cache space reclamation, the system then determines future request to the file based in part on a next access auxiliary table (NAAT) associated with the file, which was created prior to receiving the request to read and stored in a persistent storage location of the storage system. Based on the determination, the system evicts from the cache memory at least one chunk of a read unit (RU) whose next access is a furthest among the cached chunks.

29 Claims, 14 Drawing Sheets

(56) References Cited

U.S. PATENT DOCUMENTS

| 2013/0117497 | A1 | 5/2013 | Cui et al. |
| 2013/0132509 | A1 | 5/2013 | Styles |
| 2013/0173853 | A1 | 7/2013 | Ungureanu et al. |
| 2013/0326154 | A1 | 12/2013 | Haswell |
| 2013/0326156 | A1 | 12/2013 | Cui et al. |

OTHER PUBLICATIONS

Patterson et al., Informed Prefetching and Caching, 1995, ACM, SIGOPS, pp. 79-85.*
Non-Final Office Action, U.S. Appl. No. 13/460,711, dated May 7, 2014, 10 pages.
Non-Final Office Action, U.S. Appl. No. 13/460,722, dated Jul. 30, 2014, 12 pages.
Belady, L. A., "A study of replacement algorithms for a virtual-storage computer", IBM Systems Journal, vol. 5, No. 2, 1966, pp. 78-101.
Bloom, Burton H., "Space/Time Trade-offs in Hash Coding with Allowable Errors", Communications of the ACM, vol. 13, No. 7, Jul. 1970, pp. 422-426.
Cao, Pei et al., "A Study of Integrated Prefetching and Caching Strategies", In Proceedings of the 1995 ACM SIGMETRICS joint international conference on Measurement and modeling of computer systems (1995), pp. 188-197.
Nam, Youngjin et al., "Chunk Fragmentation Level: An Effective Indicator for Rad Performance Degradation in Deduplication Storage", IEEE International Symposium of Advances on High Performance Computing and Networking (HPCC/AHPCN), Sep. 2011, 6 pages.
Quinlan, Sean et al., "Venti: a new approach to archival storage", USENIX Association, Proceedings of the FAST 2002 Conference on File and Storage Technologies, Monterey, California, USA, 13 pages.
Tan, Yujuan et al., "SORT: A Similarity-Ownership Based Routing Scheme to Improve Data Read Performance for Deduplication Clusters", International Journal of Advancements in Computing Technology (IJACT), vol. 3, No. 9, Oct. 2011, pp. 270-277.
Wallace, Grant et al., "Characteristics of Backup Workloads in Production Systems", Proceedings of the 10th USENIX Conference on File and Storage Technologies (FAST 2012), San Jose, CA, Feb. 2012, 16 pages.
Zhu, Benjamin et al., "Avoiding the Disk Bottleneck in the Data Domain Deduplication File System", USENIX Association, FAST '08, 6th USENIX Conference on File and Storage Technologies, San Jose, California, USA, Feb. 26-29, 2008, pp. 269-282.
Non-Final Office Action, U.S. Appl. No. 13/460,728, dated Mar. 11, 2015, 14 pages.
Final Office Action, U.S. Appl. No. 13/460,722, dated Jan. 29, 2015, 10 pages.

* cited by examiner

FIG. 7A

```
CR              FP                                Seq Number
6a05000019 00   f117949873 7e96c93d75cc66   0000000000000002
1c05000018 00   2aa4f802450 f8cf657bf043a   0000000000000253
1c05000018 00   00a29ef4bc5005f8a613ce16    0000000000000262
2400000001 00   2b5e63559eed916f2c6251bc    0000000000001392
2400000001 00   5fc5fa87ae2a9a5d0f362b0c    0000000000001393
2400000001 00   aa0686c22b84f090d9e0af17    0000000000001394
2400000001 00   19bc493763b0915e29c8c9e8    0000000000001395
2400000001 00   12f10d9e70d33dedd3268ab1    0000000000001396
2400000001 00   f6955b477da32f1e80f4da56    0000000000001397
2400000001 00   2464f3bfdee3e9dc3b6d68bf    0000000000001398
```

FIG. 7B

```
CR              FP                              Seq Number
0001000001 00   0205b7e98f7f0b05f2a2900d   0000000000000460418
0001000001 00   0205b7e98f7f0b05f2a2900d   0000000000000466936
0001000001 00   0205b7e98f7f0b05f2a2900d   0000000000002107097
0001000001 00   0205b7e98f7f0b05f2a2900d   0000000000002113614
0001000001 00   457038dfb99c5141d01659a1   0000000000000460419
0001000001 00   457038dfb99c5141d01659a1   0000000000000466937
0001000001 00   457038dfb99c5141d01659a1   0000000000002107098
0001000001 00   457038dfb99c5141d01659a1   0000000000002113615
0001000001 00   57a1d3805cd39602dd6651f4   0000000000000460371
0001000001 00   57a1d3805cd39602dd6651f4   0000000000002107050
```

FIG. 7C

```
CR              FP                              Seq Number           Next Seq Number
0001000001 00   0205b7e98f7f0b05f2a2900d   0000000000000460418   0000000000000466936
0001000001 00   0205b7e98f7f0b05f2a2900d   0000000000000466936   0000000000002107097
0001000001 00   0205b7e98f7f0b05f2a2900d   0000000000002107097   0000000000002113614
0001000001 00   0205b7e98f7f0b05f2a2900d   0000000000002113614   0000000000000000000
0001000001 00   457038dfb99c5141d01659a1   0000000000000460419   0000000000000466937
0001000001 00   457038dfb99c5141d01659a1   0000000000000466937   0000000000002107098
0001000001 00   457038dfb99c5141d01659a1   0000000000002107098   0000000000002113615
0001000001 00   457038dfb99c5141d01659a1   0000000000002113615   0000000000000000000
0001000001 00   57a1d3805cd39602dd6651f4   0000000000000460371   0000000000002107050
0001000001 00   57a1d3805cd39602dd6651f4   0000000000002107050   0000000000000000000
```

| CR | FP | Seq Number | Next Seq Number |
|---|---|---|---|
| 000100000100 | 57a1d3805cd39602dd6651f4 | 00000000000000460371 | 00000000000002107050 |
| 000100000100 | b742ea06bde8f630c81502cf | 00000000000000460379 | 00000000000002107058 |
| 000100000100 | 7df73998f34abff574648021 | 00000000000000460386 | 00000000000002107065 |
| 000100000100 | cb14199a48b803e7eb94577f | 00000000000000460393 | 00000000000002107072 |
| 000100000100 | e6ba807eada206e36265df1f | 00000000000000460401 | 00000000000002107080 |
| 000100000100 | 9b9850c4c7c442045cd6bb42 | 00000000000000460409 | 00000000000002107088 |
| 000100000100 | ceecd31f4502d68db679eb04 | 00000000000000460416 | 00000000000002107095 |
| 000100000100 | 0205b7e98f7f0b05f2a2900d | 00000000000000460418 | 00000000000000466936 |
| 000100000100 | 457038dfb99c5141d01659a1 | 00000000000000460419 | 00000000000000466937 |
| 000100000100 | 967ccfab818b1204f00c3add | 00000000000000460425 | 00000000000002107104 |

FIG. 7D

| CR | FP | Seq Number | Next Chunk Seq | Next CR Seq |
|---|---|---|---|---|
| 000100000100 | 57a1d3805cd39602dd6651f4 | 00000000000000460371 | 00000000000002107050 | 00000000000000460379 |
| 000100000100 | b742ea06bde8f630c81502cf | 00000000000000460379 | 00000000000002107058 | 00000000000000460386 |
| 000100000100 | 7df73998f34abff574648021 | 00000000000000460386 | 00000000000002107065 | 00000000000000460393 |
| 000100000100 | cb14199a48b803e7eb94577f | 00000000000000460393 | 00000000000002107072 | 00000000000000460401 |
| 000100000100 | e6ba807eada206e36265df1f | 00000000000000460401 | 00000000000002107080 | 00000000000000460409 |
| 000100000100 | 9b9850c4c7c442045cd6bb42 | 00000000000000460409 | 00000000000002107088 | 00000000000000460416 |
| 000100000100 | ceecd31f4502d68db679eb04 | 00000000000000460416 | 00000000000002107095 | 00000000000000460418 |
| 000100000100 | 0205b7e98f7f0b05f2a2900d | 00000000000000460418 | 00000000000000466936 | 00000000000000460419 |
| 000100000100 | 457038dfb99c5141d01659a1 | 00000000000000460419 | 00000000000000466937 | 00000000000000460425 |
| 000100000100 | 967ccfab818b1204f00c3add | 00000000000000460425 | 00000000000002107104 | 00000000000000466936 |

FIG. 7E

| CR | FP | Seq Number | Next Chunk Seq | Next CR Seq |
|---|---|---|---|---|
| 6a050000l900 | f11794987370e96c93d75cc66 | 0000000000000002 | 0000000000088038 | 0000000000088037 |
| 1c050000l800 | 2aa4f802450f8cf657bf043a | 0000000000000253 | 0000000000210697 | 0000000000000262 |
| 1c050000l800 | 00a29ef4bc500f58a613ce16 | 0000000000000262 | 0000000000210699 | 0000000000210697 |
| 240000000100 | 2b5e63559eed916f2c6251bc | 0000000000001392 | 0000000000419060 | 0000000000001393 |
| 240000000100 | 5fc5fa87ae2a9a5d0f362b0c | 0000000000001393 | 0000000000419061 | 0000000000001394 |
| 240000000100 | aa0686c22b84f090d9e0af17 | 0000000000001394 | 0000000000419062 | 0000000000001395 |
| 240000000100 | 19bc493763b0915e29c8c9e8 | 0000000000001395 | 0000000000419063 | 0000000000001396 |
| 240000000100 | 12f10d9e70d33dedd3268ab1 | 0000000000001396 | 0000000000419064 | 0000000000001397 |
| 240000000100 | f695b477da32f1e80f4da56 | 0000000000001397 | 0000000000419065 | 0000000000001398 |
| 240000000100 | 2464f3bfdee3e9dc3b6d68bf | 0000000000001398 | 0000000000419066 | 0000000000001399 |

FIG. 7F

| CR | FP | Seq Number | Next Chunk Seq | Next CR Seq |
|---|---|---|---|---|
| 230000000100 | 5b509b7fb7d23cb5abcfc940 | 0000000000000000 | 0000000000000000 | 0000000000000001 |
| 230000000100 | 5f3bc87ff84e4150549oc072 | 0000000000000001 | 0000000000164460O | 0000000000000003 |
| 6a050000l900 | f11794987370e96c93d75cc66 | 0000000000000002 | 0000000000088038 | 0000000000088037 |
| 230000000100 | 1f2e2c8c89aacf29b538ab1 | 0000000000000003 | 0000000000000000 | 0000000000000004 |
| 230000000100 | 0a0f6cc2ea8bbc0154443945 | 0000000000000004 | 0000000000417457 | 0000000000000005 |
| 230000000100 | f4c48cab5d850b4b6081baf1 | 0000000000000005 | 0000000000161337 | 0000000000000006 |
| 230000000100 | c68ab65e21b8358779ed770f | 0000000000000006 | 0000000000161338 | 0000000000000007 |
| 230000000100 | b8a2aca2b992b28a6b6f1ba8 | 0000000000000007 | 0000000000161339 | 0000000000000008 |
| 230000000100 | b3f8c6924fa3f7b9a2fc4495 | 0000000000000008 | 0000000000161340 | 0000000000000009 |
| 230000000100 | 71289fcc4106737c8c0511d687 | 0000000000000009 | 0000000000161341 | 0000000000000010 |

FIG. 7G

| CR | FP | Seq Number | Next Chunk Seq |
|---|---|---|---|
| 59ed19002c00 | 4b90817b4df12ed9b58fa20a | 00000000000000005422 | 00000000000003489928 |
| 59ed19002c00 | 7847d0590ecf828bc0ab8565 | 00000000000000005422.001 | 00000000000159178816 |
| 59ed19002c00 | 41c559107d4be909e166af0c | 00000000000000005422.002 | 00000000000282358221 |
| 59ed19002c00 | 2903a313279a109bc6a57d85 | 00000000000000005422.003 | 00000000000282358222 |
| 59ed19002c00 | 0bbc5519cb8597b80fc11328 | 00000000000000005422.004 | 00000000000287779090 |
| 59ed19002c00 | 8ac8f43f197c93f03d35c57b | 00000000000000005422.005 | 00000000000291830939 |
| 59ed19002c00 | 0a9740752ef8298503cc307 | 00000000000000005422.006 | 00000000000291830942 |
| 59ed19002c00 | 46f2d21bc21f19de3ec81af3 | 00000000000000005422.007 | 00000000000291831029 |
| 59ed19002c00 | c4dc007b0244797eb9e7a93d | 00000000000000005422.008 | 00000000000291831158 |
| 59ed19002c00 | bd916ee9cf389acd3bce92f3 | 00000000000000005422.009 | 00000000000291831200 |

802 → Next Chunk Seq

FIG. 8

SYSTEM AND METHOD OF OFFLINE ANNOTATION OF FUTURE ACCESSES FOR IMPROVING PERFORMANCE OF BACKUP STORAGE SYSTEM

CROSS-REFERENCE TO RELATED APPLICATIONS

This application is related to co-pending U.S. patent application Ser. No. 13/460,728, entitled "System and Method for Improving Performance of Backup Storage System with Future Access Prediction," filed Apr. 30, 2012, co-pending U.S. patent application Ser. No. 13/460,711, entitled "System and Method for Cache Replacement using Access-ordering Lookahead Approach," filed Apr. 30, 2012, and co-pending U.S. patent application Ser. No. 13/460,722, entitled "System and Method for Cache Replacement using Bloom Filter Lookahead Approach," filed Apr. 30, 2012. The disclosure of the above applications is incorporated by reference herein in its entirety.

FIELD

Embodiments of the present invention relate generally to data storage systems. More particularly, embodiments of the invention relate to improving performance of a backup storage system based on offline annotation of future access.

BACKGROUND

The performance of a computer system largely depends on the performance of its slowest component. For example, retrieving data from a non-volatile storage device, such as one or more hard disk drives, to a high-speed memory, is limited by the speed of the disk drives. Various techniques are used to improve performance. One such technique is known as "caching," in which data retrieved from disk are retained in the high-speed memory in order to improve the access time for that data on subsequent accesses. Another technique is known as "prefetching," in which data are retrieved from disk in advance of an explicit request for the data, in order to have the data available in high-speed memory at the time the request is made. Still another technique is the reordering of input from and output to the disk, when feasible. For example, a disk with a queue of several blocks to write might reorder the write operations to minimize the latency of repositioning a disk head between writes.

During a sequential read operation, an application program, such as a restore program, will process numerous data records stored at contiguous locations in the storage device. It is desirable during such sequential read operations to prefetch the sequential data into cache in anticipation of the requests from the application program. A sequential caching algorithm detects when a device is requesting data as part of a sequential access operation. Upon making such detection, the storage controller or server may begin prefetching sequential data records following the last requested data record into a cache in anticipation of future sequential accesses. The cached records may then be returned to the application performing the sequential data operations at speeds substantially faster than retrieving the records from a non-volatile storage device.

The field of deduplicating storage systems adds a layer of complexity to the problem of improving read performance. In a deduplicating storage system, unique pieces of data known as "chunks" or "data chunks" are identified via hashes known as "fingerprints." In this specification, chunks and data chunks are used interchangeably. To read back a file, the system loads a list of fingerprints for the file, and then reads the chunks corresponding to the fingerprints. One method for finding the chunks on disk is to have an index that associates a fingerprint with a container, which is an aggregate of many chunks. These chunks can be concatenated together and compressed to save disk space beyond the benefits that deduplication provides. Once identifying the correct container, the file system can load the metadata for the container, which lists all the fingerprints of the chunks stored in the container, along with their locations. To read a particular chunk, the system reads a read unit (RU) such as a compression region (CR) containing the chunk desired. At this point other chunks in that RU are also loaded into memory, because the RU is the unit of an input/output (IO) operation when reading from the disk. In contrast, when writing to the disk, a full container is written in one IO operation.

Once read into memory, the RU can be retained in a cache to improve the performance of later accesses to chunks in the RU. The system reserves some amount of memory as a cache for RUs, and whenever a new one is loaded into memory, another RU must be removed from the cache when the cache space is insufficient. A typical paradigm is to cache data in a "least recently used" (LRU) fashion, using past accesses as a prediction of future behavior. Often such a prediction is inaccurate and unreliable, particularly, for a backup storage system. LRU works well on data with good locality (e.g., stored in nearby locations); it does not work as well with fragmented storage locations such as would be found in a deduplicated storage system. In a backup storage system, especially a deduplicating backup storage, files are chunked and chunks are stored across multiple different storage locations or containers. Further, after the incremental backup and/or garbage collection, the chunks of the files are dispersed within the storage system and the locality tends to worsen.

When reading back a deduplicated file, two things are different from "traditional" file systems that have used LRU caching effectively for many decades. Firstly, deduplicated data can be fragmented among many different places on a disk. In a standard file system, when writing a file, the entire file is typically written contiguously in the file system, and a single large read is sufficient to provide the file to a reader. In a deduplicating system, a file may consist of references to many different containers because versions of the file have been created over time. Secondly, restoring backup data may result in an extremely large read request, which provides information in advance about all the fingerprints that will be needed over an extended period of input/output (IO) transactions. The quantity of "look-ahead" information available may be substantially greater than in a traditional system. Given the differences, it is desirable to analyze the order of chunks in a file before servicing a request to read the file.

BRIEF DESCRIPTION OF THE DRAWINGS

Embodiments of the invention are illustrated by way of example and not limitation in the figures of the accompanying drawings in which like references indicate similar elements.

FIGS. 7A-7G are examples of step-by-step results following a method for creating NAAT for a file according to certain embodiments.

FIG. 8 is an example of results following another method for creating NAAT for a file according to certain embodiments.

DESCRIPTION OF EMBODIMENTS

Figure 1:
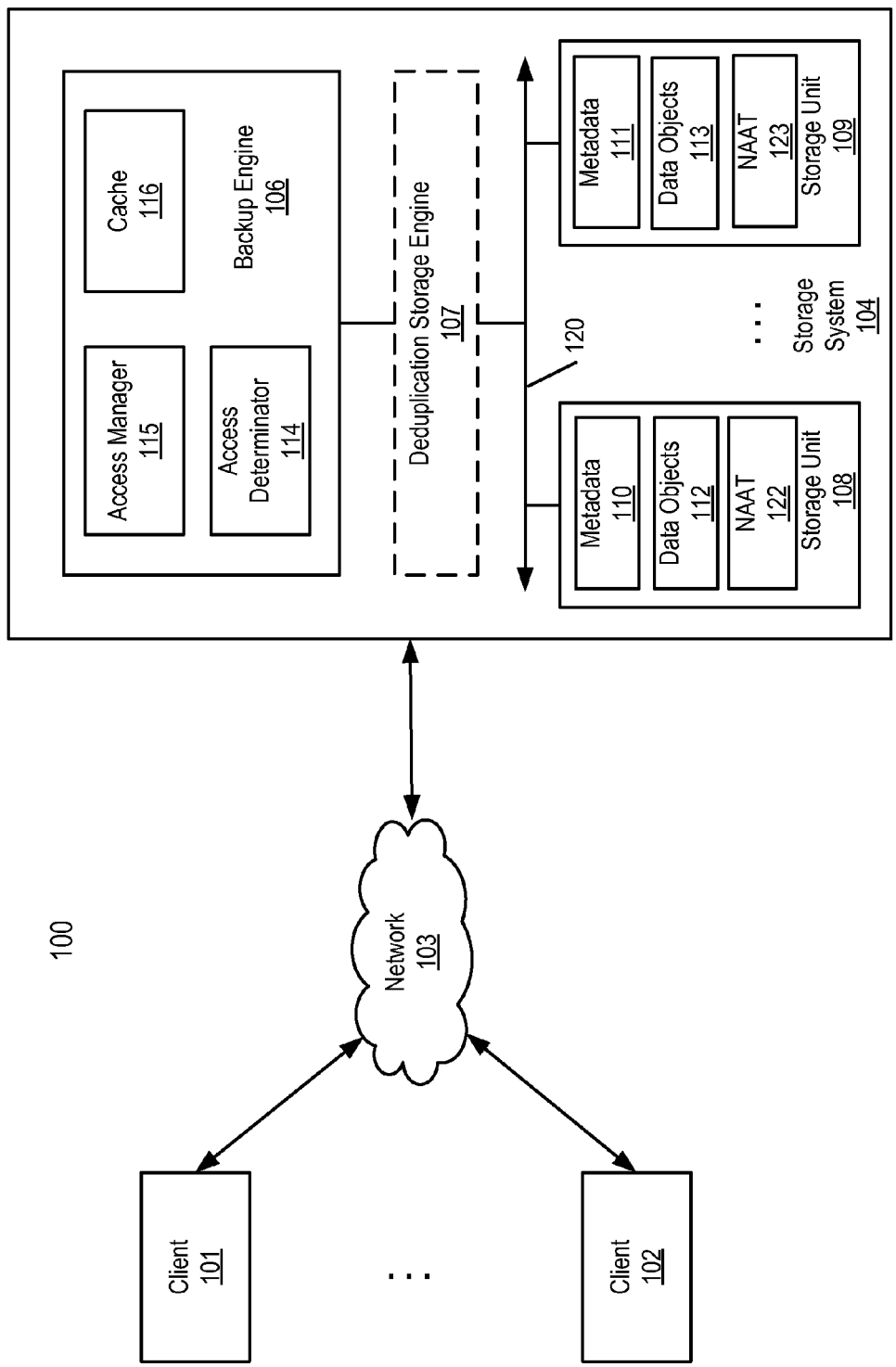
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when or after a file such as a backup file is written into a storage system such as a backup storage system, a next-access auxiliary table (NAAT) is created which may be stored in a persistent storage as a NAAT file. In one embodiment, a NAAT file is an auxiliary file containing information about future accesses, which can be used to improve performance for subsequent reads of the file. In another embodiment, a NAAT is created and then embedded within the file. The NAAT associated with the file creates annotations for each chunk in the file, indicating whether a chunk will be accessed again and the location of the next access if it does. In addition, the NAAT may also indicate whether a RU will be accessed again and the location of the next access to that CR if it does. An indication of next access may be fine-grained, in which case a NAAT entry for a chunk specifies a precise next access order (e.g., indicating a particular chunk will be accessed after 9 chunks). Or the indication of next access may be coarse-grained, in which case a NAAT entry for a chunk specifies only a general range (e.g., indicating a particular chunk will be reaccessed soon, in a while, far in the future, or never). The same levels of granularity may be used for the next access order for a RU too. The NAAT of the file, containing next-access annotation of chunks of the file, is stored in a persistent storage location within the backup storage system.

When the file is retrieved and accessed from the backup storage system, a determination is performed based on the NAAT of the file to determine whether a chunk occurred at a first portion or location of the file will be subsequently accessed again at a second portion or location of the file and/or whether a RU storing the chunk accessed at a first portion or location of the file will be subsequently accessed again at a second portion or location of the file. Based on the determination, certain actions may be performed to improve subsequent access of the chunk, for example, with better prefetching, caching, and/or scheduling. For example, a chunk that is to be accessed again subsequently within the same file may be prefetched and/or cached in a cache memory prior to the actual access of the chunk, such that subsequent access of the same chunk later on can be improved. Alternatively, based on the NAAT, a related file (e.g., incremental backup file) may be identified and certain actions may also be performed on the related file to improve subsequent access of the related file.

In addition, an efficient cache replacement (also referred to as cache eviction) scheme can be employed based on the NAAT of a file to further improve data access performance. In one embodiment, the system evicts a data object (e.g., a chunk or a RU) from the cache that would likely be accessed within the same file furthest in the future based on the indication of the NAAT of the file. That is, a data object that will not likely be accessed again or for a while within the same file is considered as a top candidate for eviction. A data object may represent a chunk of a file. In a deduplicating storage system, such as a Data Domain deduplication storage system, a data object may represent a data chunk, a CR containing one or more data chunks, a container containing one or more CRs, or a combination thereof. Such an efficient eviction scheme can be implemented using various methods. Note that throughout this application, a CR is utilized as an example of a read unit; other units may also be applied.

In one embodiment, a system cache is separated into two sections. One section is for RUs, such as CRs, and the other section is for chunks. If the CR cache is full and space for a new CR is required, the system evicts a CR from the CR cache whose NAAT entry indicates that its next access will be furthest in the future. Since the NAAT may indicate that some chunks within the CR will be accessed in the future, the chunks may be moved from the CR cache section into the chunk cache section and the corresponding CR may then be evicted from the CR cache section. The chunk cache may similarly be full, in which case the chunks that the NAAT indicates will be used furthest in the future will be removed from the chunk cache to make room for the newly added chunks.

In another embodiment, the relative sizes of the CR cache and chunk cache are adjustable. The cache dynamically compares the hit rates of the chunk cache and the CR cache, considering the sizes of caches and cache storage units, and it determines an appropriate partitioning between the CR cache and the chunk cache. If more hits occur in the chunk cache per unit storage, compared to the CR cache, the size of the chunk cache is increased and the size of the CR cache is decreased by the same amount. Similarly, the chunk cache size can be increased to favor it being relatively more effective. In one embodiment, the change to the partition is a fraction of the remaining cache space. As an example, if the chunk cache is 20% of the entire cache and is increased by 5% of the remaining 80% currently allocated to the CR cache, the partition would shift from 20% to 24%. In one embodiment, absolute limits on the partition are imposed, for example ensuring that the chunk cache is at least 10% and no more than 90% of the entire cache.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, optional deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object (e.g., a chunk) via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the next access auxiliary tables, i.e. NAATs, are stored in storage units. NAATs 122-123 are stored in storage units 108-109 respectively. An NAAT is an auxiliary file and it can be created when a file is written into a storage system. It can also be created after a file is already written into the storage system, for example, it can be created during a storage maintenance routine such as a garbage collection process. A NAAT is created prior to receiving a request to read the associated file and it is used to improve read efficiency. A NAAT is optional; if it does not exist, the system can use traditional LRU cache replacement or any other form of cache replacement, including dynamically computing a future access ordering disclosed in earlier related applications cited in the above "Related Applications" section.

In one embodiment, for each chunk within a file, an entry (e.g., a table row) is created in the NAAT associated with the file. The entry includes a CR identifier identifying the CR containing the chunk, the fingerprint of the chunk, and a logical access order of the chunk, e.g., the sequence number of the chunk within the file. It also includes two more fields indicating next access information. One of the fields is a next chunk access field, and it indicates when the chunk will be accessed next within the file. If the chunk is no longer accessed in the file, a zero may be filled in the field. The other additional field is a next CR access field, and it indicates when any chunk within the CR containing the instant chunk will be accessed next within the file. A logical access order of the other chunk may be filled in the field. If the CR will not be reaccessed within the file, a 0 may be filled in the field instead. As discussed herein above, instead of exact logical access order, a coarser indication of a next access (soon, in a while, far in the future, or not reused) may be used too in the next chunk access and next CR access fields. Note not all five fields are required to implement the inventive idea embodied within. For example, a NAAT may be implemented without the fields of logical access orders, fingerprints and CR identifiers of the chunks.

In another embodiment, for each chunk within a file, multiple entries are created in the NAAT associated with the file. A first entry includes a CR identifier identifying the CR containing the chunk, the fingerprint of the chunk, and a logical access order of the chunk, and a next chunk access field indicating when the chunk will be accessed next within the file. An additional entry or additional entries follow the first entry, and each includes a CR identifier identifying the CR containing the chunk, in which the CR is the same as the CR included in the first entry; a fingerprint of another chunk within the CR; a next chunk access field indicating when the other chunk will be accessed next within the file; and a logical access order and subscript, in which the logical access order is the same as the order specified for the instant chunk and the subscript is an extra identifier used to indicate a dependency relationship between the additional row or rows and the instant chunk. This dependency relationship is a hint to the system that when the instant chunk is read, the one or more additional chunks in the same CR will be first accessed at particular points in the future. The second entry may also include a flag indicating the record is merely a hint that the system may choose to ignore. The second entry may be followed by multiple entries, optionally sorted by the order of other chunks being first accessed within the CR containing the instant chunk after the first chunk following the instant chunk. In order to create a NAAT with multiple rows for each chunk, a system has to read all accesses to a CR containing the instant chunk before creating these records. Note not all fields are required to implement the inventive idea embodied within. For example, a NAAT may be implemented without the fields of logical access orders, fingerprints, and CR identifiers of the chunks.

In one embodiment, the system does not include hints for future accesses to a CR with every access to the CR. Instead, the hints for a CR are included in the NAAT once every N chunk accesses, and during a read operation the system retains those hints for at least N accesses. In this fashion, a CR that has already been evicted from the cache may be reaccessed at a later point, with the system knowing exactly which chunks within that CR will be reaccessed in the future. If the CR is then evicted from the cache again, chunks that merit retention in the chunk cache can be retained. The value of N is a choice between extra state at runtime (keeping hints for CRs that are not being cached) and extra storage in the NAAT (by repeating hints frequently). In one embodiment, hints are repeated at most every 10,000 chunk accesses.

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, backup engine 106 includes an access determinator 114, access manager 115, and cache 116. Access manager 115 is to provide file services to a variety of clients, such as a backup/restore application, to backup files stored in storage units 108-109, in this example, represented as data objects 112-113 that may be optionally deduplicated by deduplication storage engine 107. Typically, when a request is received to access a file such as a backup file, data objects of the requested file are loaded into a memory of storage system 104. Since the file may be large, only a portion of data objects of the file is loaded or cached in the memory at a time for accessing. In one embodiment, in response to a request to read a portion of a file from storage units 108-109, the portion of the file is loaded in memory and future requests to the storage units 108-109 are based on reading of the NAAT of the file. Subsequent access of the file is optimized based on the determination, for example, including managing a data cache, prefetching data, or scheduling the order in which requests are handled. In this specification, the terms data cache and cache are used interchangeably.

When a data chunk is being accessed, the data object (e.g., a CR) containing the chunk is loaded into cache 116 and the request is then serviced using the data object from the cache. Cache 116 may be allocated as a designated memory region of the system memory, which is typically limited in size. When a data object is requested for access, access manager 115 inspects cache 116 to determine whether the requested data object is in cache 116. If so (e.g., cache hit), the data object from cache 116 is used to service the request. If the requested data object is not in cache 116 (e.g., cache miss), access manager 115 is to load the requested data object from storages 108-109 into cache 116. If cache 116 is full, a data object currently stored in cache 116 has to be evicted from cache 116 to make room for the data object currently requested. A data object may represent a data chunk, a CR of multiple data chunks, or a container of multiple CRs. According to one embodiment, multiple data objects, such as a CR or a container, may be read into the memory from storage units 108-109. However, only the related individual data chunks may be cached in cache 116.

According to one embodiment, when a file such as a backup file is retrieved and accessed from a backup storage system, access determinator 114 is to determine based on metadata, such as the NAAT of the file, whether a data object occurred at a first portion or location of the file is likely to be subsequently accessed again at a second portion or location of the file. Based on the determination, certain actions may be performed to improve subsequent access of the data object, for example, with better prefetching, caching, and/or scheduling. In one embodiment, a data object that is likely to be accessed again subsequently within the same file may be cached in cache 116 such that subsequent access of the same data object later on can be improved. According to an alternative embodiment, based on the NAAT, a related file may be identified and certain actions may also be performed on the related file to improve subsequent access of the related file.

In addition, an efficient cache replacement scheme is employed based on the determination to further improve data access performance. In one embodiment, the access manager 115 is to evict a data object from cache 116 that would be unlikely to be accessed again or likely to be accessed in the same file furthest in the future based on the determination. That is, a data object that is unlikely to be accessed again within the same file (or a stream of one or more related files) is considered as a top candidate for eviction. If every object currently in the cache is likely to be accessed again within the same file or a related file, no cache replacement algorithm can achieve a better cache hit rate than one that evicts the object that will be accessed furthest in the future. In practice, any object that will not be reaccessed for "a while" is an equally good candidate for eviction from the cache as long as there is no other object that, if evicted, can result in a better cache hit rate. Herewith we use the term "a while" to indicate a long enough interval that retaining an object in the cache in preference to another object will result in a lower cache hit rate, that is, it represents an equivalence class of all objects that will be evicted from the cache by the optimal cache replacement policy, prior to being reaccessed. An efficient cache eviction scheme with an approximately optimal cache hit rate would evict any object that is unlikely to be accessed again, and in the absence of any available objects that will not be reaccessed, would evict an object that will not be reaccessed for "a while". Such an efficient eviction scheme can be implemented using various lookahead determination methods.

Figure 2:
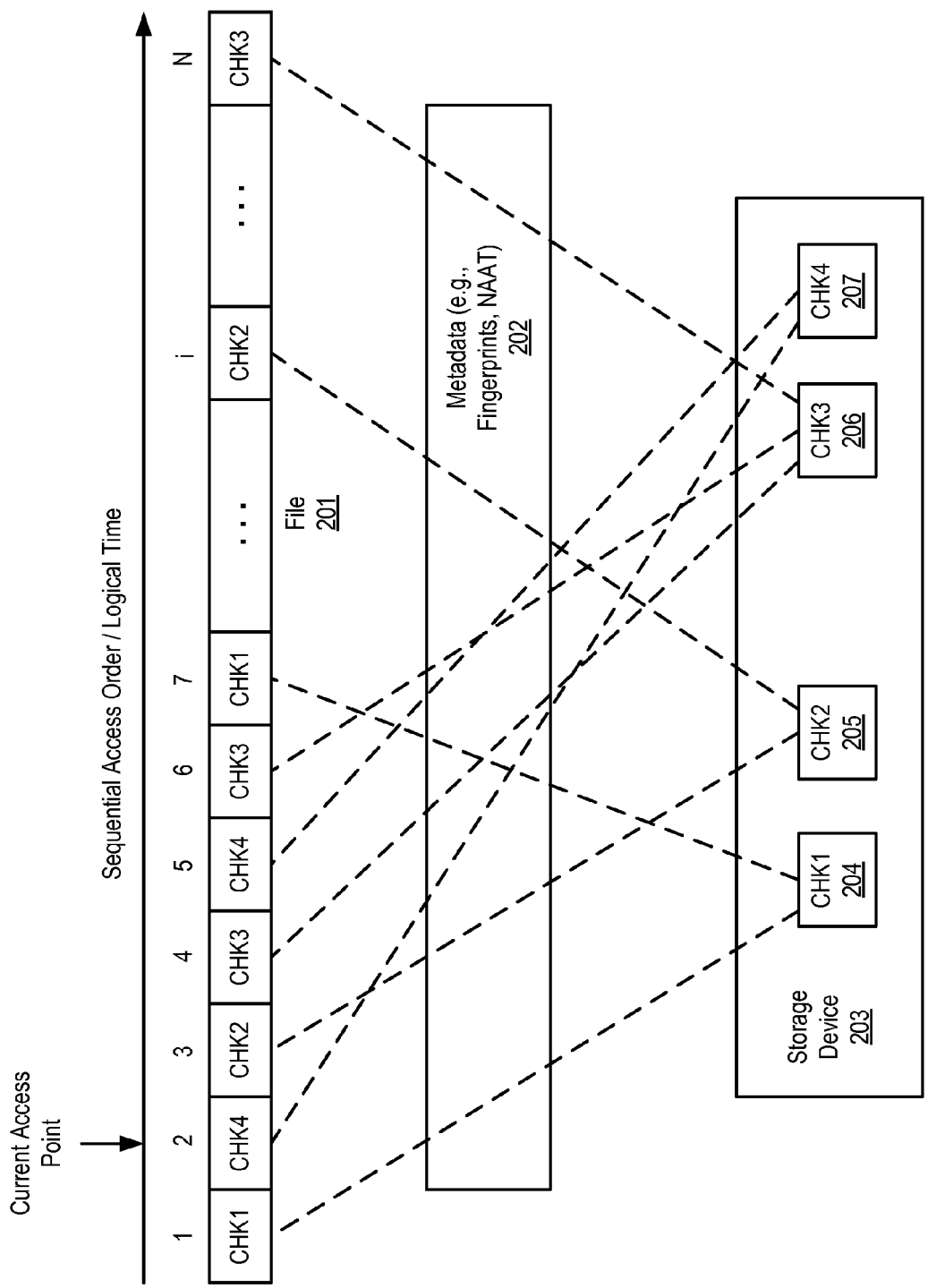
FIG. 2 is a block diagram illustrating a process for retrieving a file from storage according to one embodiment of the invention.

FIG. 2 is a block diagram illustrating a process for retrieving a file from storage according to one embodiment of the invention. Referring to FIG. 2, file 201 (e.g., a backup file) includes many data objects to be sequentially accessed. For example, a media file such as an audio or video file is typically read sequentially. Alternatively, a client application such as a backup application or antivirus program may instruct the storage system to read the data objects in sequence. In this example, the storage system as shown is a deduplicated storage system, where only the deduplicated chunks 204-207 are stored in storage device 203, while file 201 contains many chunks that are formed from the deduplicated data chunks 204-207. Any one of deduplicated data chunks 204-207 may occur in multiple locations within file 201, which may be recorded via metadata 202, which includes fingerprints and the NAAT. In this example, for the purpose of illustration, there are four deduplicated chunks: CHK1, CHK2, CHK3, and CHK4. Often, more deduplicated chunks are used to construct a file.

According to one embodiment, an access determinator, such as access determinator 114 of FIG. 1, is to determine the access timing of each of data chunks 204-207 based on metadata 202 such as the NAAT associated with file 201. Based on the determined access timing, an access manager, such as access manager 115 of FIG. 1, is to perform certain actions that will improve the subsequent access of the data chunks 204-207. In one embodiment, based on the determined access timing of a particular data object, the access manager can prefetch the data object from storage device 203 into a memory prior to the access time of the corresponding data object. For example, given the current access order is at access order or sequence order of 2 as shown in FIG. 2, it is determined that CHK4 and CHK2 will be accessed at the access orders 2 and 3 based on the NAAT of the file. Even though CHK4 is the next object to be referenced, it is more efficient to read CHK2 along with CHK1 before reading CHK4, and then to read CHK3 along with CHK4 in antici-pation of its use at time 4. In such a situation, the access manager can prefetch CHK2, CHK4, and CHK3 from storage device 203 into the cache memory, such that at the access order 2-4, CHK4, CHK2, and CHK3 are available from the memory without having to retrieve the same from storage device 203 at that time.

According to another embodiment, the access manager may maintain a particular chunk in the cache memory if the access determinator determines that the chunk will be accessed again soon. For example, it is assumed that given the current access order at access order 4, CHK4 and CHK3 may be maintained in the cache memory in response to a cache space reclamation request, since they will be accessed in the next access orders 5-6. LRU caching would be similarly effective at keeping CHK4 and CHK3 in memory because they would have been accessed very recently. But looking ahead, CHK2 is referenced significantly later (at access order i) and CHK3 is referenced significantly later than that (at access order N). According to one embodiment, if there is a need to evict a data object from the cache memory, a chunk that will not be accessed for a while may be considered as a top eviction candidate. In this example, when CHK1 is accessed at access order 7, CHK2 is the least recently used of the four chunks, and with LRU caching it might be removed from the cache to make room for CHK1. But according to one embodiment, by determining that CHK2 will be used at access order i before CHK3 or CHK4 is referenced, CHK3 or CHK4 would be a preferred candidate for eviction. Since CHK3 is accessed at access order N and CHK4 is not accessed again, if there is a need to evict a data chunk from the cache memory, CHK4 will be evicted first.

Figure 3:
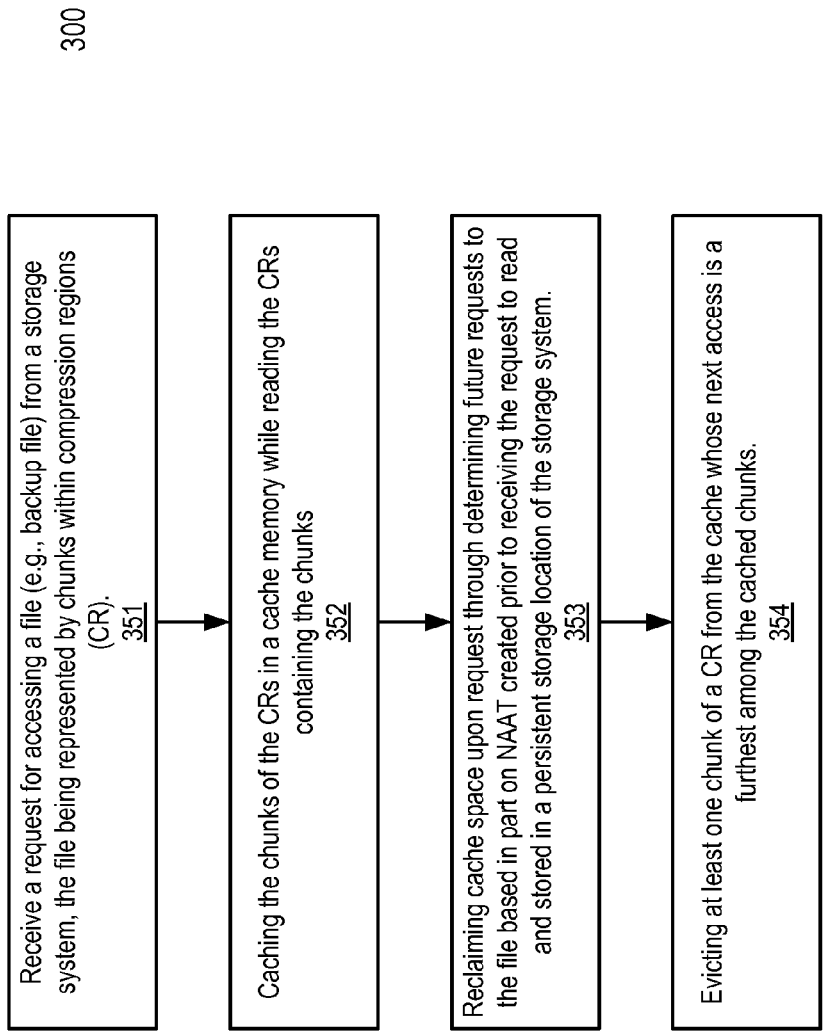
FIG. 3 is a flow diagram illustrating a method for efficiently providing file services in a storage system according to one embodiment of the invention.

FIG. 3 is a flow diagram illustrating a method for efficiently providing file services in a storage system according to one embodiment of the invention. Method 300 may be performed by backup engine 106 of FIG. 1, which may be implemented as a processing logic in software, hardware, or a combination of both. Note that throughout this application, a backup storage system is utilized as an example of a storage system. The techniques described throughout this application can also be applied to other types of storage systems. For example, backup engine 106 can be implemented as any type of file servers. Referring to FIG. 3, at block 351, a request for accessing a file of a storage system is received, where the file is presented by data objects such as deduplicated data chunks, where the data chunks may be stored in CRs and the CRs may be stored in containers. At block 352, a first portion of data chunks of the file is retrieved to service the request and the retrieved chunks are cached into a cache memory. More data chunks are retrieved to cache when cache has available space. When the cache space is insufficient for further caching, the method goes to block 353. Block 353 reclaims cache spaces based on the NAAT associated with the file and identifies eviction candidates based on the NAAT's hints. At block 354, at least a chunk of a CR whose next access is the furthest among the cached chunks will be evicted. As discussed herein above, eviction may also include a whole CR, in which case the system may decide to cache some of the chunks within the CRs in the cache.

Figure 4:
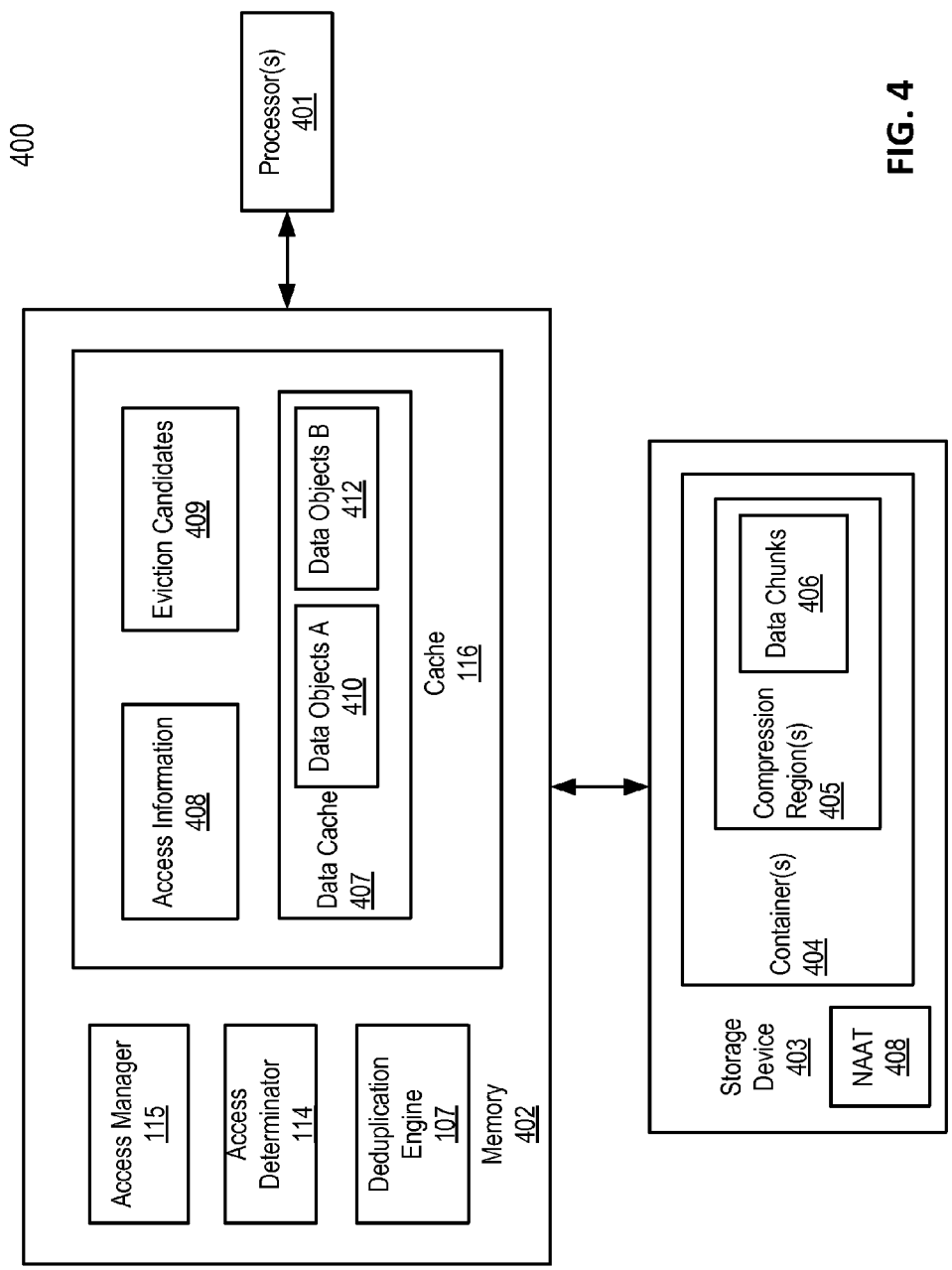
FIG. 4 is a flow diagram illustrating a storage system using an efficient cache replacement method according to certain embodiments.

FIG. 4 is a flew block diagram illustrating a storage system using an efficient cache replacement method according to certain embodiments. System 400 may be implemented as a part of storage system 104 of FIG. 1. Referring to FIG. 4, access manager 115 and access determinator 114 are executed in memory 402 by one or more processors or processor cores 401. In addition, cache 116 is allocated from memory 402 specifically for managing access of data chunks 406, CRs 405, and containers 404 stored in storage unit 403.

Cache 116 includes data cache 407, access information 408, and eviction candidates 409. Data cache 407 is to cache data objects 410 loaded from storage unit 403, where any of data objects 410 may, in this example, represent data chunks 406, a CR of one or more data chunks, a container of one or more CRs, or a combination thereof of a deduplication storage system. In some embodiments, Data cache 407 may be further divided into two sections, and one portion may be dedicated to chunks and the other to CRs. Data objects A 410 and data objects B 412 represent two different types of entities, chunks and CRs, that may be located in different sections of the cache. Note that throughout this application, a deduplication storage system is described as an example of a storage system; however, other types of storage systems can also be applied.

According to one embodiment, in response to a request to retrieve a file, access manager 115 is to load certain amount of data objects of the file into memory 402 and to store the data objects in data cache 407 as data objects 410 if data cache 407 has enough space. Note that the file may be a backup file with a large size. Typically, the access manager is to read a fixed number of data objects at a time dependent upon the size of the cache memory and use the cached data objects to service the file service requests. In one embodiment, in determining the access order or patterns of the data objects, the NAAT of the file and metadata (e.g., fingerprints) of the data objects representing the file are loaded incrementally into the memory and analyzed. Since the file may be a large file and metadata of the file may also be relatively large, only a portion of the metadata is loaded. Thereafter access determinator 114 and access manager 115 processes the NAAT and metadata of the file and identify eviction candidates based on these data and read requests.

In one embodiment, a max heap data structure or module is utilized as an eviction candidate data structure to store the top eviction candidate that will be evicted first during the cache eviction process. A heap is a data structure created using a binary tree. It can be seen as a binary tree, where all levels of the tree, except possibly the last one (deepest) are fully filled. If the last level of the tree is not complete, the nodes of that level are filled from left to right. Each node is related to each of its children according to a comparison predicate defined for the data structure. Heaps with a mathematical "greater than or equal to" comparison function are referred to as max heaps; those with a mathematical "less than or equal to" comparison function are referred to as Min Heaps. For the purpose of determining a top eviction candidate, a max heap is utilized as an eviction candidate data structure according to one embodiment. It will be appreciated that other types of data structures and/or algorithms may also be utilized. It is also appreciated that other types of files other than backup files, which are likely accessed sequentially (e.g., media files such as audio, video, or image files), may also be applied herein.

During the cache space reclamation or eviction process, the max heap function is invoked to pop the top entry from the max heap data structure, which corresponds to a data object identified by the NAAT as representing the furthest logical time that the corresponding data object will next be accessed. The corresponding data object is then identified based on the metadata (and the associated sequence number) and the data object can be evicted from data cache 407 to make room for another data object.

Figure 5A:
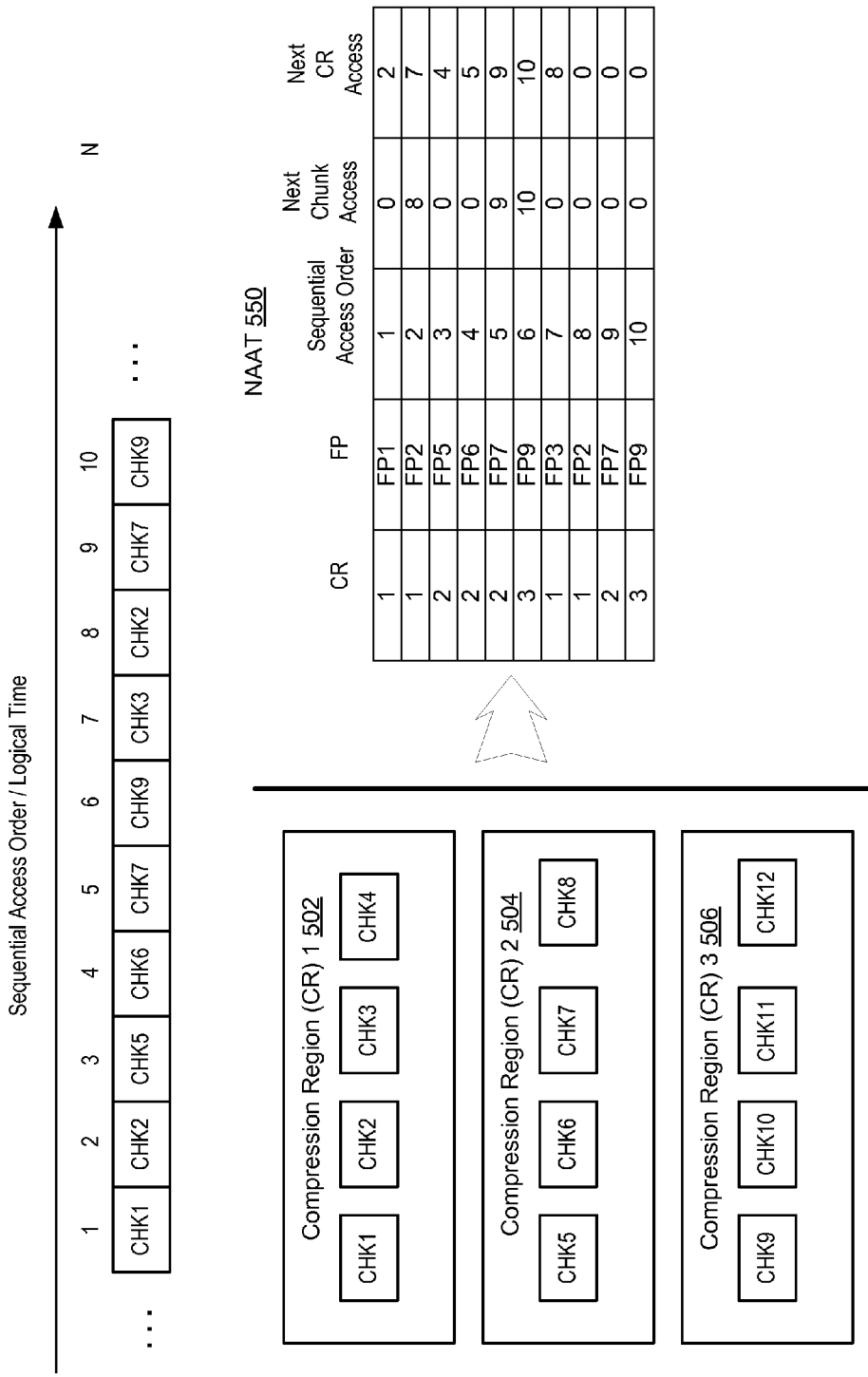
FIG. 5A is a block diagram illustrating a method for creating NAAT entries for a portion of a file according to certain embodiments.

FIG. 5A is a block diagram illustrating a method for creating NAAT entries for a portion of a file according to certain embodiments. A file is represented as a sequence of chunks and only 10 of the chunks are shown for the purpose of illustration. The chunks of the file are read according to sequential access order/logical time from 1 to 10. The chunks are stored separated in different CRs 502-506 within the system. As discussed herein above, in a deduplicating storage system, chunks are often stored in fragmented storage location. In this example, chunks 1-4 are stored in CR1, chunks 5-8 are stored in CR2, and chunks 9-12 are stored in CR3. For each chunk, one entry is created in the NAAT of the file. The entry includes a CR identifier identifying the CR containing the chunk, the fingerprint of the chunk, a sequential access order of the chunk, a next chunk access field, and a next CR access field. For chunk 1, for example, the CR identifier is 1 as chunk 1 is stored in CR 1 at block 502. The FP of chunk 1 is represented by FP1 in the NAAT. Chunk 1 is accessed only once in the file, thus its next chunk access is zero because it is no longer accessed. The next CR access for chunk 1 is 2 because CR1 is accessed again at sequential access order 2, right after chunk 1, so the sequential access order 2 is entered in the next CR access field. Similarly, for chunk 2, the CR identifier is 1 as chunk 2 is also stored in CR 1 at block 502. The FP of chunk 2 points to FP2. The next access of chunk 2 is at sequence access order 8 according to the sequential access order/logical time. The next CR access for chunk 2 is 7 because CR1 is not accessed again until sequence access order 7. The same process repeats for all chunks of the files, and the system will build a table shown as NAAT 550. Note a file generally contains large number of chunks and NAAT 550 is just a simplified illustration. A more structured approach will be discussed below to create the NAAT for a file.

Figure 5B:
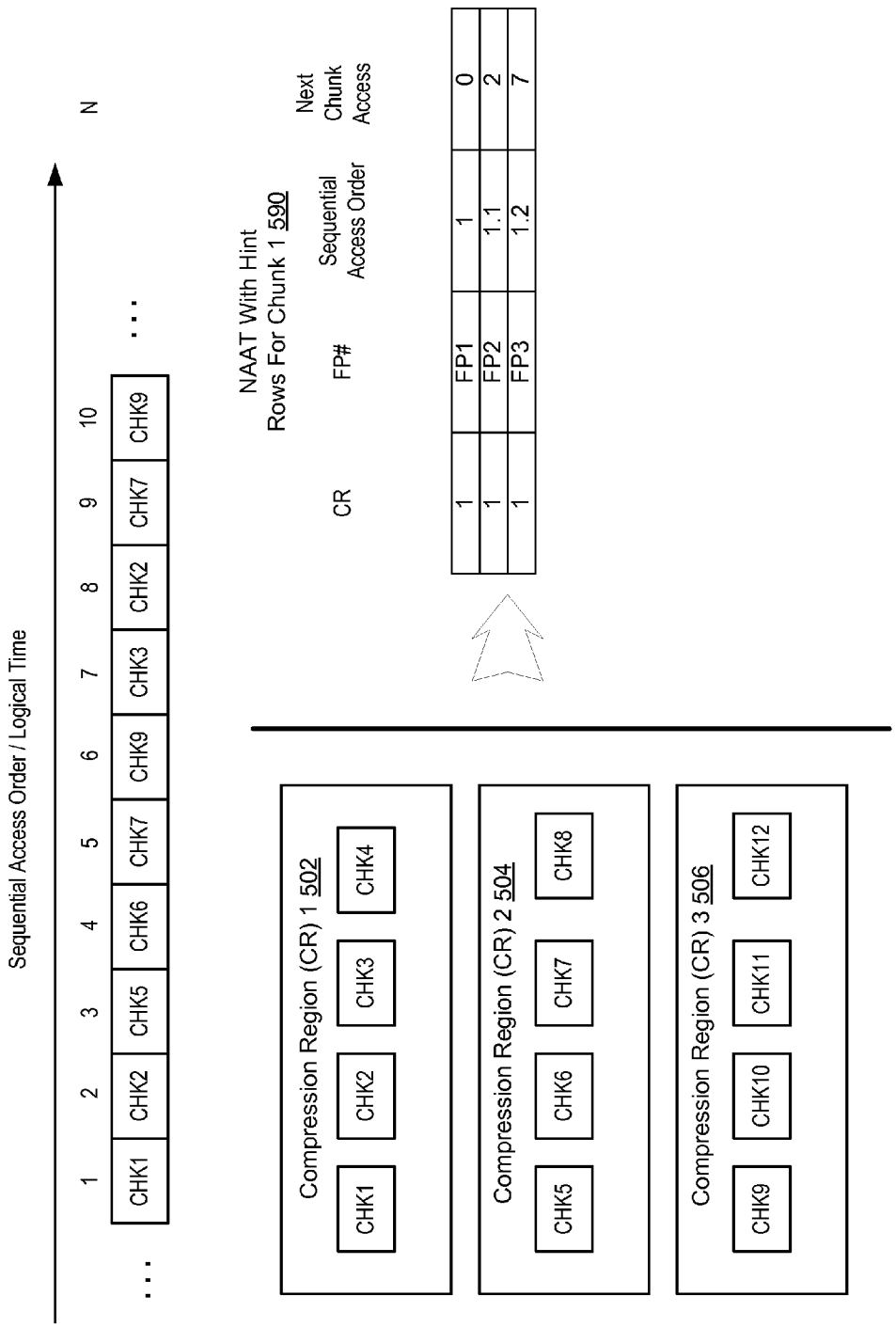
FIG. 5B is a block diagram illustrating another method for creating NAAT entries for a portion of a file according to certain embodiments.

FIG. 5B is a block diagram illustrating another method for creating NAAT entries for a portion of a file according to certain embodiments. In FIG. 5A, NAAT 550 only records the next access to each chunk and to the CR in which the chunk appears. Another embodiment of the NAAT will go one step further, and it provides additional hints about future accesses to other chunks in a CR. In this embodiment, multiple entries are created for each chunk, and the entries record future accesses to other chunks in the same CR as the accessed chunk. FIG. 5B shows NAAT entries 590 for chunk 1. The first entry is the entries for the chunk under process, chunk 1. It contains the CR identifier (1), fingerprint of chunk 1 (FP 1), the sequence order of chunk 1 (1), and next chunk access (0). Note chunk 1 is not accessed again in the file, thus the next chunk access field is 0. Then the NAAT records the first access of other chunks within the CR. Here the other chunks are chunks 2-4 within CR1. Optionally the other chunk accesses can be sorted based on which chunk is first accessed after the instant chunk, chunk 1. The first chunk being accessed after the instant chunk is chunk 2, thus the hint is denoted as 1.1. The sequence order for the chunk 2 hint is 1.1 as it is the first hint included after chunk 1. The CR identifier is also included in the entry. The next chunk being accessed after chunk 2 in CR1 is chunk 3. As it shows, it is accessed at sequence order number 7. Thus the entry for chunk 3 hint includes CR identifier (1), fingerprint of chunk 3 (FP3), hint of the chunk 3 after the instant chunk (1.2), and next chunk access (7). The only other remaining chunk in CR1 is chunk 4. Like chunk 1, it is not accessed after the instant chunk. When a chunk is not accessed again, no hint of reaccess is needed, thus the NAAT table does not include a row for chunk 4. Note entries for chunk hints (rows with sequential access order 1.1-1.3) must be flagged so a system analyzing the NAAT knows these rows are hints only and the system may ignore the hints.

Figure 6A:
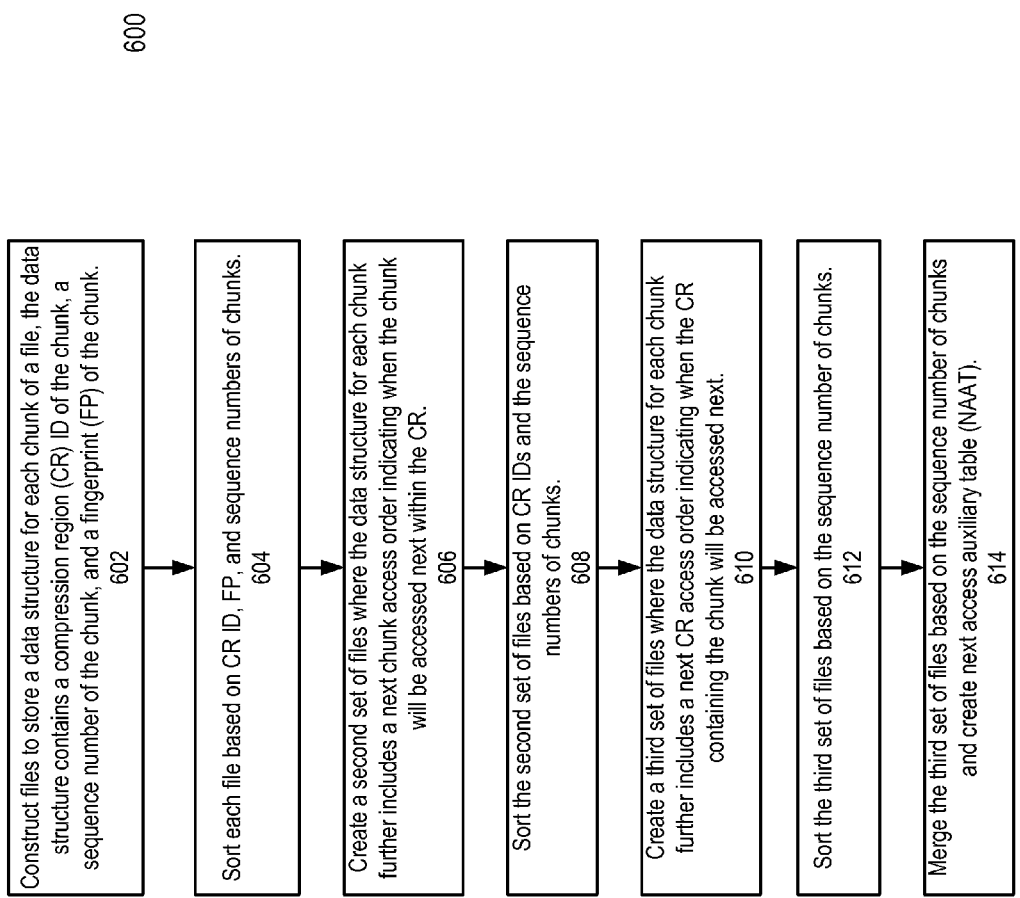
FIG. 6A is a flow diagram illustrating a method for creating NAAT for a file according to certain embodiments.

FIG. 6A is a flow diagram illustrating a method for creating the NAAT for a file according to certain embodiments. Method 600 may be performed by system 400 of FIG. 4.

According to one embodiment, method 600 utilizes a divide and conquer methodology to create a NAAT for a file. It works on pieces of a file that are small enough to handle efficiently, and then merges the created output files to create the final NAAT. Referring to FIG. 6, at block 602, the system reads a file, and for each chunk, it identifies the container and CRs containing the chunk. It annotates each chunk with a sequence number to represent logical timestamps. It selects an output file out of a first set of N output files, using the CR. In one embodiment, the number N is a power of two and depends on the number of chunks in the file for which the NAAT is created. Selecting one file out of the N output files is done by selecting $\log_2(N)$ bits within the CR identifier. For each chunk, a fingerprint of the chunk is saved to one of the first set of the output files. Thus the first set of output files contains a CR identifier, a sequence number, and a fingerprint for each chunk. One example of the first set of output files is illustrated in FIG. 7A. FIG. 7A contains a computer printout of a process implementing the method. The first column (CR) lists CR identifiers of the chunks, the second column (FP) lists fingerprints of the chunks, and the last column (Seq Number) lists the sequence numbers of each chunk. Referring back to FIG. 6A, at block 604, each file of the first output files is sorted based on CR identifier, fingerprint, and sequence numbers of chunks, in that order. FIG. 7B shows the result of an output file in 7A after sorting. Note that, as shown at reference 702, after sorting, four chunks with an identical fingerprint (0205b7e98f7fb05f2a2900d) are listed sequentially at the top of the output file.

Referring to FIG. 6A, for each of the first set of output files after block 604, the system creates a new file with a next sequence number for each chunk at block 606. FIG. 7C shows the printout of one new output file of the created second set of output files. The last column (Next Seq Number) is new, and the other columns are the same as shown in FIG. 7B. The new column records the next access of the chunks. Note the Next Seq Number for the first row is 00000000000000466936 (see reference 704), which is the same as the sequence number (Seq Number) of the second row (see reference 706). It is so because the same chunk (the chunk with fingerprint 0205b7e98f7f0b05f2a2900d) is accessed right after the first row. Also note that if a chunk is no longer accessed, the next sequence number may be denoted as all zeros, like Next Seq Number of the last row at FIG. 7C (shown as 00000000000000000000 at reference 708). Referring to FIG. 6A, at block 608, the new output file is sorted again based on CR and sequence number, in that order. This puts all accesses to a given CR together in the second set of output files to which that CR has been directed, in order of access. FIG. 7D shows the result of the output file in 7C after sorting.

Referring to FIG. 6A, for each output file of the second set of output files after block 608, the system creates a new file with the next CR sequence number for each chunk at block 610. A file in the third set of output files now contains five columns. FIG. 7E shows the result of output file in 7D after adding the new column. Referring to FIG. 6A, the third set of output files are then sorted at block 612 based on sequence numbers. FIG. 7F shows the result of sorting of the output file in FIG. 7E. Referring back to FIG. 6A, after the sorting is complete, all the output files of the third set are merged by sequence number. The resulting file is the NAAT for the original file. FIG. 7G shows a portion of the NAAT after merging. Note FIG. 6A shows only one particular way of creating the NAAT for a file. In practice, a table is not the only data structure one may use to create the NAAT, other arrays, lists, and trees are possible to implement the NAAT. The steps of sorting and merging are not mandatory. For example, for a smaller file, the NAAT can be created without creating all three sets of output files, and the NAAT can be created even without creating any intermediary output files.

Figure 6B:
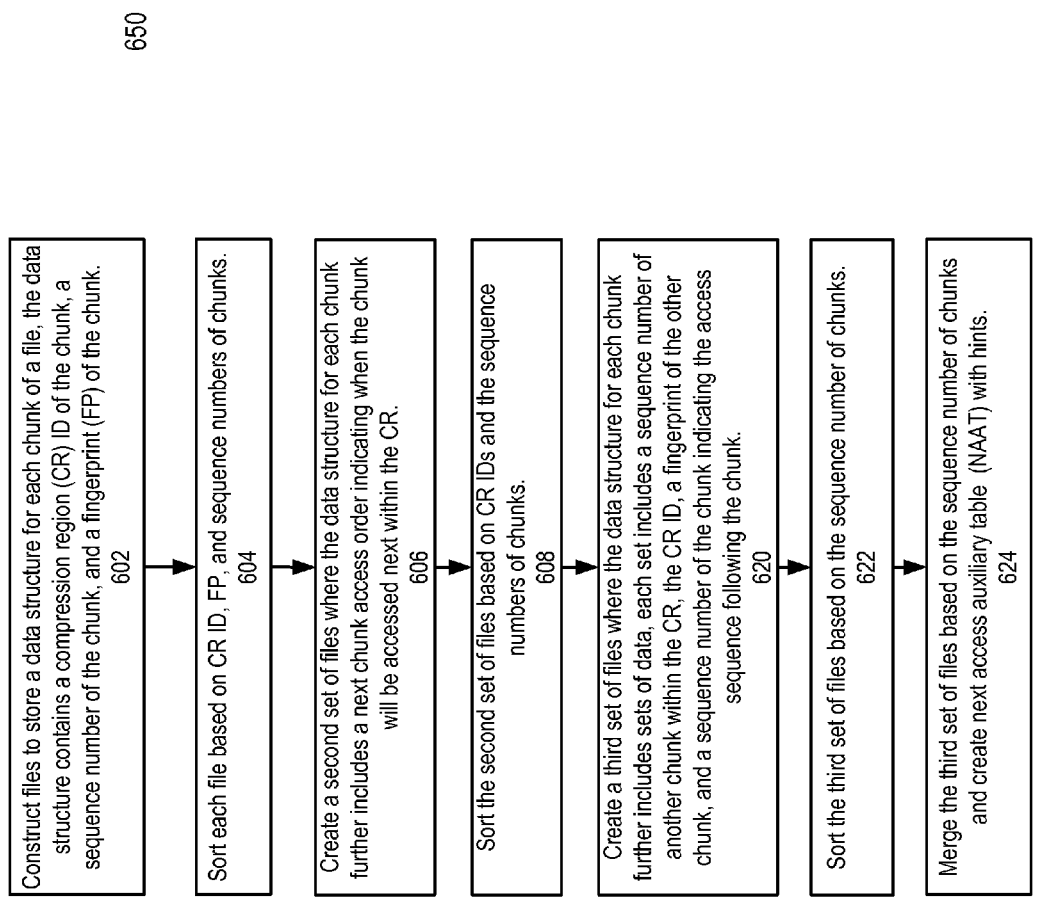
FIG. 6B is a flow diagram illustrating another method for creating NAAT for a file according to certain embodiments.

FIG. 6B is a flow diagram illustrating another method for creating a NAAT for a file according to one embodiment of the invention. This embodiment of the NAAT contains hints for the next access of each other chunk within the CR. Process 650 in FIG. 6B is similar to process 600 in FIG. 6A and thus the same block numbering is used for the same steps. Referring to FIG. 6B, process 650 follows the same steps as process 600 and sort a second set of output files for a file at block 608. Afterward, process 650 goes to block 620 instead of 610 as illustrated in FIG. 6A. In block 620, a third set of output files are created. The output files contain multiple entries for each chunk. The first row is what has already existed after block 608, and it includes a CR identifier, a fingerprint, a sequential access order and a next chunk sequence for the instant chunk. The following rows identify the first access after the instant chunk to each of the other chunks in the same CR, and must also include a flag indicating that the rows are merely hints that system may ignore. These following rows include the CR identifier (which will be the same as the first row, representing the instant chunk, as all chunks are from the same CR), a fingerprint of another chunk the row represents, the same sequential access order of the instant chunk followed by an dependent sequence number indicating the order the other chunks are being accessed within the file, and a next chunk sequence. For each chunk, the output file may contain either one row representing that chunk or R+1 rows, where R is the number of chunks accessed in the same CR later in the file. For example, in FIG. 5B, for chunk 1, there are three rows in the NAAT, because while CR1 contains 4 chunks, chunk 4 is not accessed later, thus no hint is provided for chunk 4.

The determination whether to include a single row or one row per chunk being accessed depends on the frequency of hint repetition, N. A CR that is accessed within N chunk accesses of the point at which hints were included does not have hints for other chunks included. Instead, during read, the hints should be retained for at least N accesses after being read from the NAAT.

The selection of N can be a tradeoff between on-disk overhead (for a low value of N) and in-memory overhead (for a large value of N, if these hints should be retained for at least N records). Note that if a hint is not retained, the system may incorrectly infer that a chunk contained within a CR will not be reaccessed, and fail to cache it; this impacts performance but not correctness of the system.

Referring to FIG. 6B, after the third set of output files are created, they are sorted based on the sequential access orders of chunks at block 622. The sorted files are then merged based on the sequential access orders of chunks at block 624. A NAAT with hints for the original file is created. FIG. 8 contains a computer printout result of a process implementing the method 650. Note after sorting at block 622, the hints appear adjacent to the actual access, thus the sequential access orders are listed sequentially as 00000000000000005422-00000000000000005422.009 in FIG. 8 (see reference 802).

Figure 9:
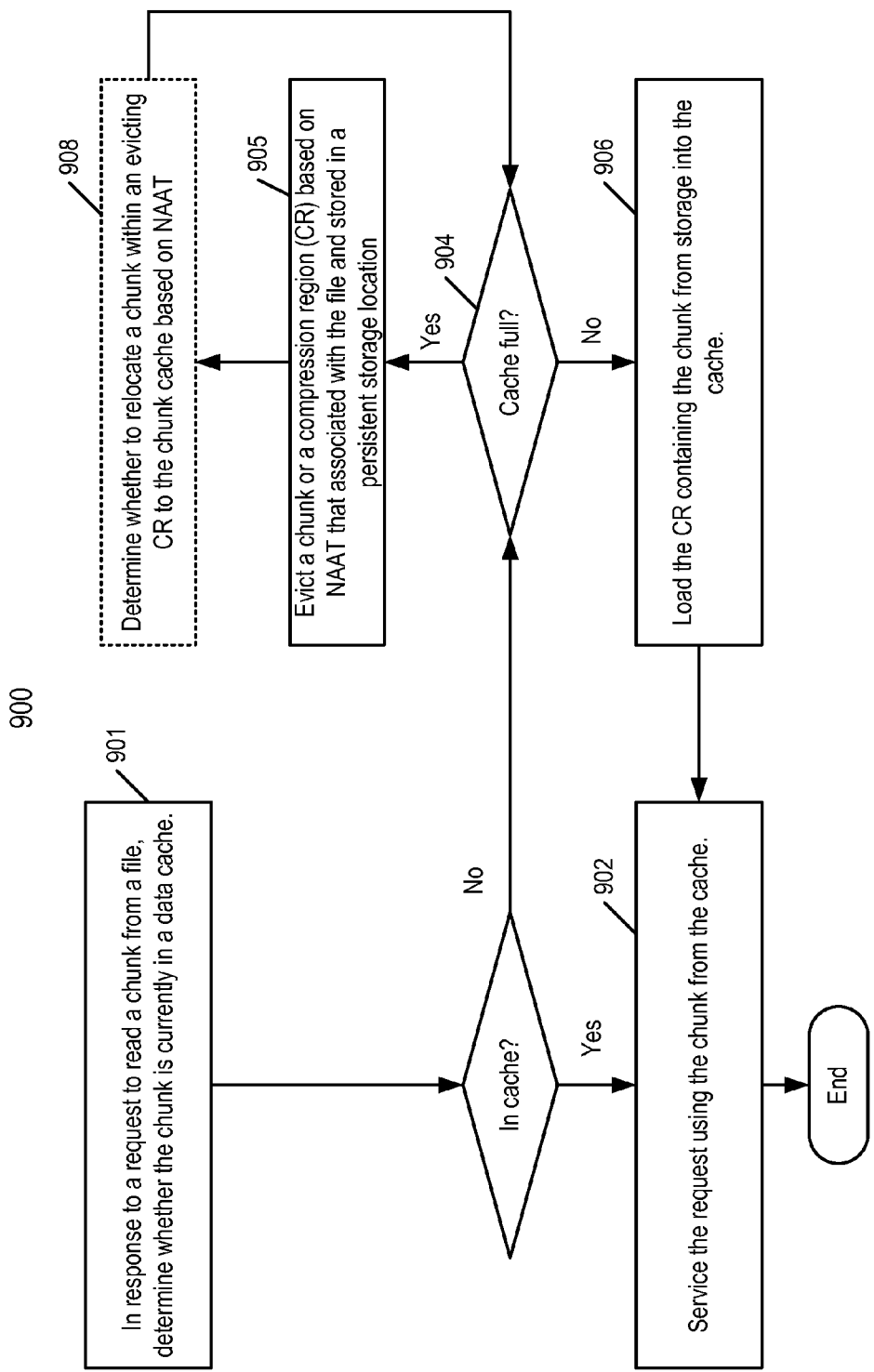
FIG. 9 is a flow diagram illustrating a method for cache space reclamation according to one embodiment.

FIG. 9 is a flow diagram illustrating a method for cache space reclamation according to one embodiment. The process may be performed by backup engine 106 of FIG. 1, which may be implemented as processing logic in software, hardware, or a combination of both. Referring to FIG. 9, at block 901, in response to a request to read a chunk from a file (e.g., a backup file), processing logic determines whether the chunk is currently in a data cache. In a deduplicated storage system, a file may contain many deduplicated chunks that may occur at multiple locations within the file. If the requested chunk is located in the data cache, at block 902, the request is serviced using the chunk from the data cache. If the requested chunk is not in the cache, at block 904, processing logic determines whether the cache is currently full. If the cache is not full, at block 906, the CR containing the requested chunk is loaded from the storage into the cache, and the request is serviced using the chunk from the cache at block 902. If the cache is full, at block 905, processing logic evicts at least a chunk from the cache that will not be accessed for a while to make room for the CR containing the requested chunk loaded from the storage. The determination of which chunk to evict is based on the NAAT of the file, which is created and stored in the storage system prior to the request. In one embodiment, processing logic can evict a chunk after determining which chunk will no longer be accessed within the file or not be accessed for a while based on next access chunk field of the NAAT. Alternatively, processing logic can evict a CR after determining which CR no longer contains a chunk that the file will access or contain only chunks that the file will not access in a while. In one embodiment, a cache includes both chunk cache and CR cache sections. If a CR is evicted, at block 908, process logic then determines if any of the chunks within the CR should be kept in cache. The determination may be based on utilization of the CR. For example, the system may set a threshold of utilization level, i.e., if fewer than a set fraction of chunks within a CR are being reused, those chunks are deemed important enough to be kept in the chunk cache, but if the CR utilization is above a threshold, the CR is evicted from the cache without moving individual chunks. (The logic behind such a threshold is that if many chunks in a CR are going to move from the CR cache to the chunk cache, evicting the CR is not actually freeing cache memory.) If a chunk of an evicting CR should be kept, the chunk will be relocated to the chunk cache section from the CR cache section. Afterward, processing logic checks if the cache space is sufficient, and the same eviction process continues until enough cache space is sufficient for the CR containing the requested chunk.

Figure 10:
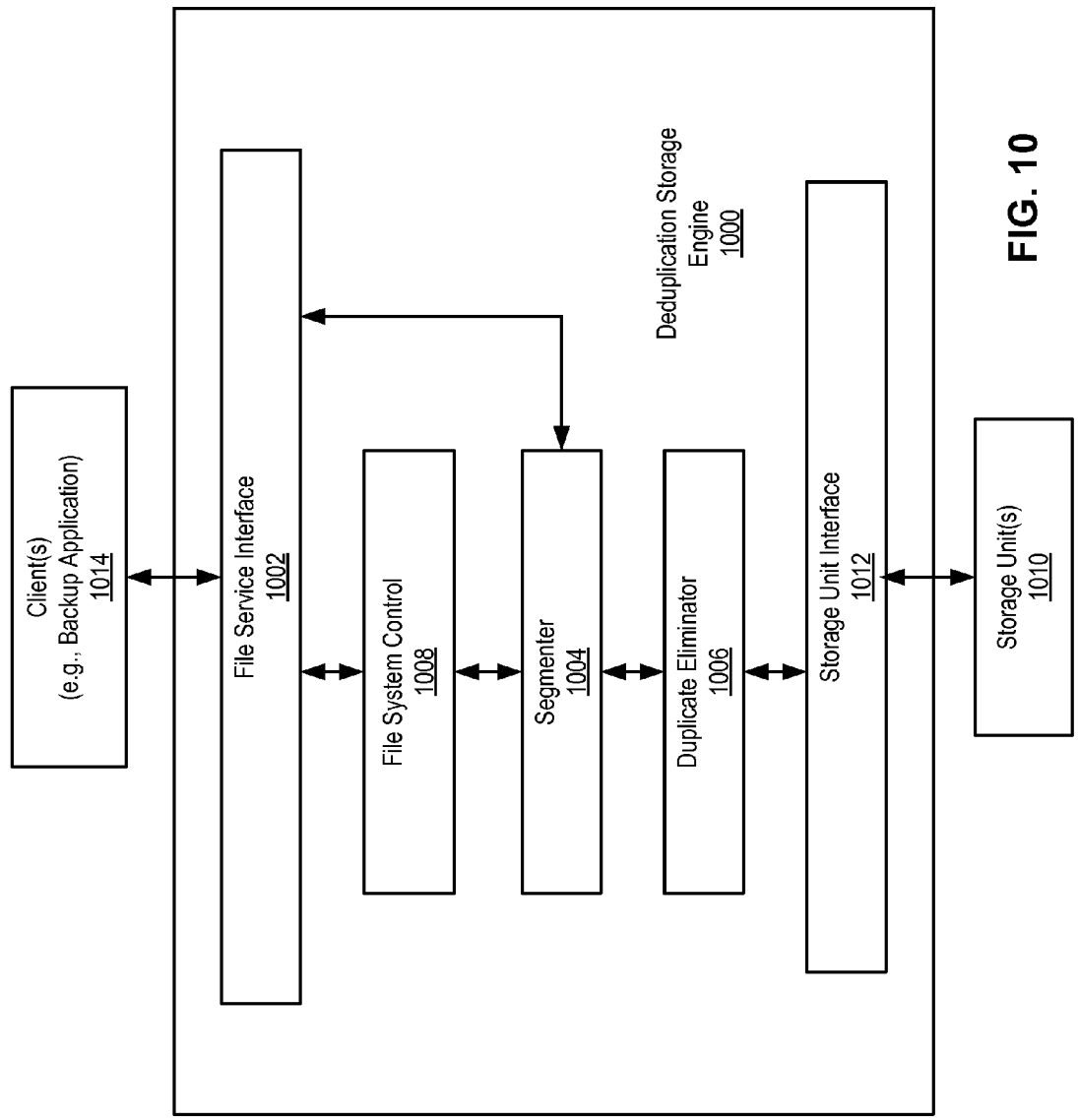
FIG. 10 is a block diagram illustrating a deduplicated storage system according to one embodiment of the invention.

FIG. 10 is a block diagram illustrating a chunk storage engine according to one embodiment of the invention. For example, deduplication storage engine 1000 may be implemented as part of a deduplication storage system as described above, such as deduplication storage engine 107 of FIG. 1. Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1002 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008 processes information to indicate the chunk(s) association with a file. In some embodiments, a list of fingerprints is used to indicate chunk(s) associated with a file. File system control 1008 passes chunk association information (e.g., representative data such as a fingerprint) to an index (not shown). The index is used to locate stored chunks in storage units 1010 via storage unit interface 1012. Duplicate eliminator 1006 identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (not shown) into one or more storage containers stored in storage units 1010. The deduplicated chunks may be further compressed using a variation of compression algorithms, such as a Lempel-Ziv algorithm before being stored.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates with an index (not shown) to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving a request to read at least a portion of a file from a storage system, wherein the file is represented by a plurality of chunks stored in a plurality of read units (RUs) of the storage system, each RU including multiple chunks;
   caching the plurality of chunks of the RUs in a cache memory of the storage system;
   in response to a request for cache space reclamation, determining future requests to the file based in part on a next-access auxiliary table (NAAT) associated with the file, wherein the NAAT comprises a pluralities of entries, each corresponding to one of the chunks of the file, each entry including a next chunk access order of one chunk, indicating when that same chunk will be accessed next, and wherein the NAAT was created prior to receiving the request to read a portion of the file and stored in a persistent storage location of the storage system, wherein the NAAT comprises a first entry corresponding to a first chunk that is associated with a second entry corresponding to a second chunk, the second entry including a fingerprint of the second chunk,
   a second logical access order of the second chunk that will be accessed within the same RU after the first chunk, and
   a flag indicating that the second entry represents a hint record, wherein the hint record indicates that the second chunk is inserted in the NAAT upon each reference to a RU that is different from the RU of a preceding chunk; and
   evicting from the cache memory at least one chunk of a RU whose next access is a furthest amongst the cached chunks.

2. The method of claim 1, wherein the NAAT is embedded within the file.

3. The method of claim 1, wherein the storage system is a deduplicating storage system.

4. The method of claim 1, wherein each entry of the NAAT further comprises:
   a next RU access order indicating when the RU containing the chunk will be accessed next.

5. The method of claim 4, wherein each entry of the NAAT further comprises:
   a logical access order of the chunk within the file;
   a RU identifier identifying the RU containing the chunk; and
   a fingerprint of the chunk.

6. The method of claim 4, wherein the cache memory comprises a RU cache to cache chunks of the RUs and a chunk cache to cache individual chunks that are not associated with the RUs in the RU cache.

7. The method of claim 6, wherein sizes of the RU cache and the chunk cache are adjusted based on cache hit rates of the RUs and sizes of the RUs within the RU cache.

8. The method of claim 6, wherein evicting at least one chunk of a RU comprises:
   identifying a RU cached in the RU cache whose next access is the furthest based on the next RU access order of the NAAT;
   identifying one or more chunks within the RU that will be accessed again based on the next chunk access order;
   determining whether to relocate the one or more chunks of the RU from the RU cache to the chunk cache based on utilization of the chunks in the RU; and
   relocating chunks of the RU from the RU cache to the chunk cache if number of the chunks in the RU that will be accessed again is above a predetermined threshold.

9. The method of claim 1, wherein each entry of the NAAT further comprises:
   a flag indicating that the entry corresponds to a read.

10. The method of claim 1, wherein each entry of the NAAT further comprises:
    a logical access order of the first chunk;
    a RU identifier identifying the RU containing the first chunk; and
    a fingerprint of the first chunk.

11. The method of claim 1, wherein each entry of the NAAT further comprises:
    a logical access order of the first chunk;
    an indication of a dependency of the second chunk upon the first chunk; and
    a RU identifier identifying the RU containing the first and second chunks.

12. A computer-implemented method, comprising:
    receiving a request to read at least a portion of a file from a storage system, wherein the file is represented by a plurality of chunks stored in a plurality of read units (RUs) of the storage system, each RU including multiple chunks;
    caching the plurality of chunks of the RUs in a cache memory of the storage system;
    in response to a request for cache space reclamation, determining future requests to the file based in part on a next-access auxiliary table (NAAT) associated with the file, wherein the NAAT comprises a pluralities of entries, each corresponding to one of the chunks of the file, each entry including a next chunk access order of one chunk, indicating when that same chunk will be accessed next, and wherein the NAAT was created prior to receiving the request to read a portion of the file and stored in a persistent storage location of the storage system, wherein the NAAT comprises a first entry corresponding to a first chunk that is associated with a second entry corresponding to a second chunk, the second entry including a fingerprint of the second chunk,
a second logical access order of the second chunk that will be accessed within the same RU after the first chunk, and
a flag indicating that the second entry represents a hint record, wherein the hint record is inserted upon a first reference to a RU and after a specified number of chunk references subsequent to a preceding hint and
evicting from the cache memory at least one chunk of a RU whose next access is a furthest amongst the cached chunks.

13. A non-transitory computer-readable medium having instructions stored therein, which when executed by a processor, cause the processor to perform operations, the operations comprising:
receiving a request to read at least a portion of a file from a storage system, wherein the file is represented by a plurality of chunks stored in a plurality of read units (RUs) of the storage system, each RU including multiple chunks;
caching the plurality of chunks of the RUs in a cache memory of the storage system;
in response to a request for cache space reclamation, determining future requests to the file based in part on a next-access auxiliary table (NAAT) associated with the file, wherein the NAAT comprises a pluralities of entries, each corresponding to one of the chunks of the file, each entry including a next chunk access order of one chunk, indicating when that same chunk will be accessed next, and wherein the NAAT was created prior to receiving the request to read a portion of the file and stored in a persistent storage location of the storage system, wherein the NAAT comprises a first entry corresponding to a first chunk that is associated with a second entry corresponding to a second chunk, the second entry including a fingerprint of the second chunk,
a second logical access order of the second chunk that will be accessed within the same RU after the first chunk, and
a flag indicating that the second entry represents a hint record, wherein the hint record indicates that the second chunk is inserted in the NAAT upon each reference to a RU that is different from the RU of a preceding chunk; and
evicting from the cache memory at least one chunk of a RU whose next access is a furthest amongst the cached chunks.

14. The non-transitory computer-readable medium of claim 13, wherein the NAAT is embedded within the file.

15. The non-transitory computer-readable medium of claim 13, wherein the storage system is a deduplicating storage system.

16. The non-transitory computer-readable medium of claim 13, wherein each entry of the NAAT further comprises:
a next RU access order indicating when the RU containing the chunk will be accessed next.

17. The non-transitory computer-readable medium of claim 16, wherein the cache memory comprises a RU cache to cache chunks of the RUs and a chunk cache to cache individual chunks that are not associated with the RUs in the RU cache.

18. The non-transitory computer-readable medium of claim 17, wherein sizes of the RU cache and the chunk cache are adjusted based on cache hit rates of the RUs and sizes of the RUs within the RU cache.

19. The non-transitory computer-readable medium of claim 17, wherein evicting at least one chunk of a RU comprises:
identifying a RU cached in the RU cache whose next access is the furthest based on the next RU access order of the NAAT;
identifying one or more chunks within the RU that will be accessed again based on the next chunk access order;
determining whether to relocate the one or more chunks of the RU from the RU cache to the chunk cache based on utilization of the chunks in the RU; and
relocating chunks of the RU from the RU cache to the chunk cache if number of the chunks in the RU that will be accessed again is above a predetermined threshold.

20. The non-transitory computer-readable medium of claim 13, wherein each entry of the NAAT further comprises:
a logical access order of the chunk within the file;
a RU identifier identifying the RU containing the chunk; and
a fingerprint of the chunk.

21. The non-transitory computer-readable medium of claim 13, wherein each entry of the NAAT further comprises:
a flag indicating that the entry corresponds to a read.

22. The non-transitory computer-readable medium of claim 13, wherein each entry of the NAAT further comprises:
a logical access order of the first chunk;
a RU identifier identifying the RU containing the first chunk; and
a fingerprint of the first chunk.

23. The non-transitory computer-readable medium of claim 13, wherein each entry of the NAAT further comprises:
a logical access order of the first chunk;
an indication of a dependency of the second chunk upon the first chunk; and
a RU identifier identifying the RU containing the first and second chunks.

24. A non-transitory computer-readable medium having instructions stored therein, which when executed by a processor, cause the processor to perform operations, the operations comprising:
receiving a request to read at least a portion of a file from a storage system, wherein the file is represented by a plurality of chunks stored in a plurality of read units (RUs) of the storage system, each RU including multiple chunks;
caching the plurality of chunks of the RUs in a cache memory of the storage system;
in response to a request for cache space reclamation, determining future requests to the file based in part on a next-access auxiliary table (NAAT) associated with the file, wherein the NAAT comprises a pluralities of entries, each corresponding to one of the chunks of the file, each entry including a next chunk access order of one chunk, indicating when that same chunk will be accessed next, and wherein the NAAT was created prior to receiving the request to read a portion of the file and stored in a persistent storage location of the storage system, wherein the NAAT comprises a first entry corresponding to a first chunk that is associated with a second entry corresponding to a second chunk, the second entry including a fingerprint of the second chunk, a second logical access order of the second chunk that will be accessed within the same RU after the first chunk, and a flag indicating that the second entry represents a hint record, wherein the hint record is inserted upon a first reference to a RU and after a specified number of chunk references subsequent to a preceding hint; and evicting from the cache memory at least one chunk of a RU whose next access is a furthest amongst the cached chunks.

25. A storage system, comprising:

an access manager to receive a request to read at least a portion of a file from a storage system, wherein the file is represented by a plurality of chunks stored in a plurality of read units (RUs) of the storage system, each RU including multiple chunks;

a cache memory coupled to the access manager to cache the chunks of the RUs;

an access determinator, in response to a request for cache space reclamation, to determine future requests to the file based in part on a next-access auxiliary table (NAAT) associated with the file and to evict from the cache memory at least one chunk of a RU whose next access is a furthest amongst the cached chunks, wherein the NAAT comprises a pluralities of entries, each corresponding to one of the chunks of the file, each entry including a next chunk access order of one chunk, indicating when that same chunk will be accessed next, and wherein the NAAT was created prior to receiving the request to read a portion of the file and stored in a persistent storage location of the storage system, wherein the NAAT comprises a first entry corresponding to a first chunk that is associated with a second entry corresponding to a second chunk, the second entry including a fingerprint of the second chunk, a second logical access order of the second chunk that will be accessed within the same RU after the first chunk, and a flag indicating that the second entry represents a hint record, wherein the hint record indicates that the second chunk is inserted in the NAAT upon each reference to a RU that is different from the RU of a preceding chunk.

26. The storage system of claim 25, wherein the NAAT is embedded within the file.

27. The storage system of claim 25, wherein the storage system is a deduplicating storage system.

28. The storage system of claim 25, wherein each entry of the NAAT further comprises:

a next RU access order indicating when the RU containing the chunk will be accessed next.

29. The storage system of claim 25, wherein each entry of the NAAT further comprises:

a logical access order of the chunk within the file;

a RU identifier identifying the RU containing the chunk; and a fingerprint of the chunk.

* * * * *